United States Patent [19]

Cubbison, Jr.

[11] Patent Number: 4,649,468

[45] Date of Patent: Mar. 10, 1987

[54] VOLTAGE DIVIDER CIRCUIT

[75] Inventor: Richard J. Cubbison, Jr., Westminster, Colo.

[73] Assignee: AT&T Information Systems Inc., Holmdel, N.J.

[21] Appl. No.: 795,624

[22] Filed: Nov. 6, 1985

[51] Int. Cl.$^4$ .............................................. H02M 3/06
[52] U.S. Cl. .......................................... 363/62; 320/1
[58] Field of Search ............... 363/62; 307/109; 320/1

[56] References Cited

U.S. PATENT DOCUMENTS

| | | | |
|---|---|---|---|
| 3,470,446 | 9/1969 | Berry et al. | 363/62 |
| 3,708,742 | 1/1973 | Gunn | 363/62 |
| 3,863,135 | 1/1975 | Atwood et al. | 363/62 |
| 4,451,743 | 5/1984 | Suzuki et al. | 307/110 |

FOREIGN PATENT DOCUMENTS 27516  3/1977  Japan ..................................... 363/62

OTHER PUBLICATIONS

"A New Switched-Capacitor Transformer and Its Analysis", Electronics and Communications in Japan, vol. 64-A, No. 2, 1981, Takahiro Inoue, pp. 30–38.

"Efficiency and Weight of Voltage Multiplier Type Ultra Lightweight D.C.-D.C. Converters", W. T. Harrigill, I. T. Myers, NASA, Lewis Res. Center, Cleveland, Ohio, USA.

Primary Examiner—William H. Beha, Jr.
Attorney, Agent, or Firm—James M. Graziano

[57] ABSTRACT

This circuit uses a simple structure of series-parallel connected capacitors and diodes to implement an n/m voltage divider circuit. There are n columns of series connected capacitors, which columns are all connected in parallel. The capacitor valves are selected so that in each column the ratio of charging capacitance to discharging capacitance is n:m. The diodes automatically switch the capacitor charging and discharging currents to the series-parallel connected capacitors.

7 Claims, 12 Drawing Figures

VOLTAGE DIVIDER CIRCUIT

FIELD OF THE INVENTION

The invention relates to voltage divider circuits and in particular to an efficient n/m voltage divider circuit composed solely of diodes and capacitors.

BACKGROUND OF THE INVENTION

In electronic circuits, there is often the need for a plurality of supply voltages. These supply voltages can be produced by a number of different methods, and one commonly used method is the use of a voltage divider circuit. The voltage divider circuit functions as a dc-to-dc converter to produce an output voltage which is lower in value than an input or primary supply voltage. Two important requirements for such a voltage divider circuit are; power handling capacity—sufficient to supply the dependent circuits, and conversion efficiency—to minimize overall power requirements.

Voltage divider circuits can be classified as either inductorless or inductor-based circuits. Inductor-based voltage divider circuits generally have high power handling capacity but have a lower conversion efficiency and consume significant power in their operation. The inductorless voltage divider circuits have high operating efficiency but are limited in their ability to produce an output voltage that is other than 1/n of the input or source voltage and these circuits also rely on extensive switching circuitry to produce the output voltage.

A typical inductorless voltage divider circuit is illustrated in an article entitled "New Switched-Capacitor Transformer and its Analysis" by T. Inoue et al published in Electronic Communication of Japan pp 30–38, February 1981. The Inoue, et al voltage divider uses n capacitors and $(3n+1)$ electronic MOS-FET switches to realize a 1/n dc-to-dc converter. This is accomplished by connecting the n capacitors in series across the source voltage for a predetermined period of time. The output voltage is then generated by activating the MOS-FET switching circuitry to connect all n capacitors in parallel across the output terminals of the voltage divider circuit.

Another 1/n voltage divider circuit is illustrated in U.S Pat. No. 3,708,742 issued to J. B. Gunn. The Gunn voltage divider circuit operates in similar fashion to the Inoue et al circuit but uses output voltage levels rather than a predetermined clock cycle to control the switching frequency of the capacitors.

SUMMARY OF THE INVENTION

The voltage divider circuit of the present invention overcomes the 1/n and extensive switching circuitry limitations of existing voltage divider circuits. This is accomplished by a simple structure of series-parallel connected capacitors and diodes which implement an n/m voltage divider circuit. There are n columns of series-connected capacitors, which n columns are all connected in parallel. The capacitor values and diode interconnections are selected so that in each column the ratio of charging capacitance to discharging capacitance is equal to n:m. The diodes automatically switch the capacitor charging and discharging currents to the series-parallel connected capacitors, thereby eliminating the need for externally generated control signals and extensive switching circuitry.

The capacitor values and diode interconnections of an n/m voltage divider are determined by starting with an array of capacitors of equal value, which array contains n columns of m series-connected capacitors. Diodes are then added to this array such that in each column the charging capacitance is c/n while the discharging capacitance is equal to c/m. The number of capacitors in the array is then reduced by combining series-connected capacitors into an equivalent single capacitance wherever possible.

The resultant voltage divider circuit contains n parallel-connected columns, each of which columns realize an n:m charge to discharge capacitance ratio. This differential between the charge and discharge capacitance is then reflected in the difference between the input and output voltage. Thus, the voltage division is accomplished by charging each capacitor in this voltage divider circuit to a fraction of the input voltage then, during the discharge cycle, combining the stored voltages to form a new sum equal to the output voltage. In this fashion, any integer ratio voltage division can be accomplished by the use of only capacitors and diodes.

DETAILED DESCRIPTION

Figure 2:
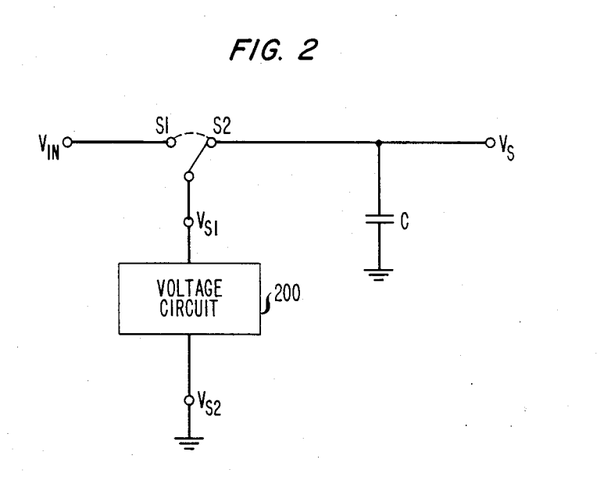
FIG. 2 illustrates the in-circuit application of the voltage divider circuit.

A typical voltage divider application is illustrated in FIG. 2 wherein a primary supply voltage $V_{IN}$ is used in conjunction with voltage divider circuit 200 to produce an output voltage $V_{OUT}$, which is applied to terminal $V_S$. A switching element S alternatively connects voltage divider circuit 200 to primary supply voltage $V_{IN}$ and output terminal $V_{OUT}$.

In one state, switching element S connects voltage divider circuit 200 to primary supply voltage $V_{IN}$, which supplies power to voltage divider circuit 200. Capacitor C has been previously charged to voltage $V_{OUT}$ and functions as a holdover capacitor to maintain voltage $V_{OUT}$ on output terminal $V_S$ while voltage divider circuit 200 is connected to primary supply voltage $V_{IN}$. While in this state, voltage divider circuit 200 performs both voltage conversion and power storage functions as will be discussed below.

In a second state, switching element S transfers voltage divider circuit 200 from primary supply voltage $V_{IN}$ to output terminal $V_S$. In this state, the power stored in voltage divider circuit 200 in the previous state is transferred to capacitor C and output terminal $V_S$ in the form of a voltage $V_{OUT}$ which functions to charge capacitor C. The voltage conversion-capacitor charging cycle is repeated, thereby effecting the required dc-to-dc conversion.

Figure 1:
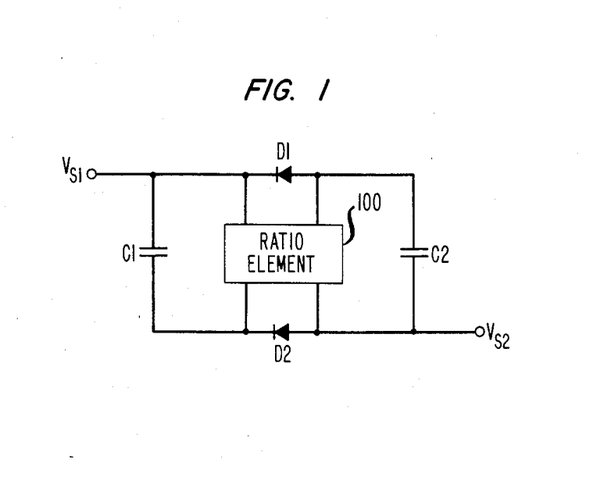
FIG. 1 illustrates the subject voltage divider circuit in block diagram form.

Voltage divider circuit 200 is composed of a plurality of interconnected capacitors and diodes. The capacitors serve both as charge storage devices and voltage divider elements. The diodes serve to provide automatic capacitor charging and discharging paths. A general form of voltage divider circuit 200 is illustrated in FIG.

1 where capacitors C1, C2 and diodes D1, D2 are the elements common to all the various n/m voltage divider circuits. The ratio element 100 consists of additional diodes and capacitors which function to implement the specific n:m voltage division ratio selected.

VOLTAGE DIVIDER GENERAL STRUCTURE

The most general form of voltage divider circuit 200 is an n/m voltage divider which converts a primary supply voltage $V_{IN}$ into an output voltage $V_{OUT}=(n/m) \, V_{IN}$. This voltage divider structure is implemented by starting with an array of capacitors of equal value, which array contains n columns of m series-connected equal value capacitors. Diodes are then added to this array such that in each column the ratio of charging capacitance to discharging capacitance is equal to n:m. The number of capacitors in the array is then reduced by combining series-connected capacitors into an equivalent single capacitance wherever possible. The resultant voltage divider circuit contains n parallel-connected columns, each of which realize an n:m charge to discharge capacitance value.

Thus, the voltage division is accomplished by splitting the primary supply voltage $V_{IN}$ into m equal parts during the capacitor charge cycle and then combining only n of these equal parts in series during the capacitor discharge cycle to produce the output voltage $V_{OUT}=(n/m) \, V_{IN}$.

THE 6/7 VOLTAGE DIVIDER

Figure 3:
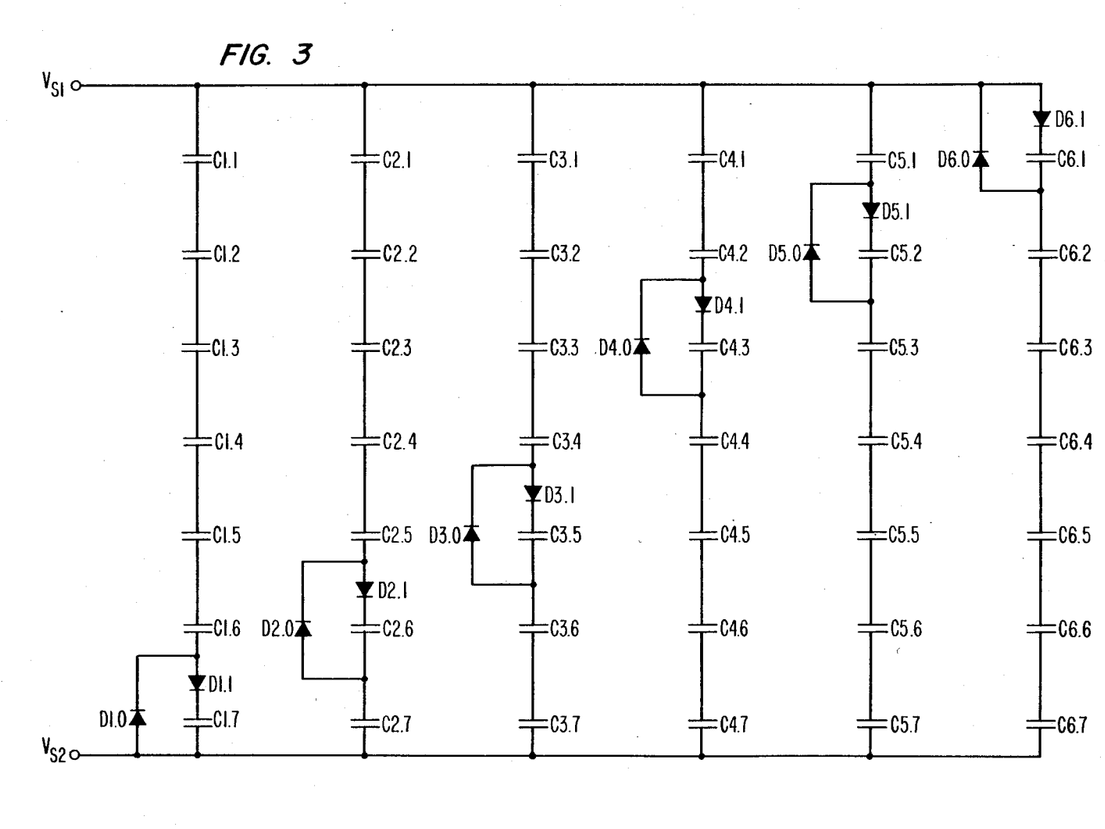
FIGS. 3–6 illustrate in step-by-step fashion the implementation of a typical voltage divider circuit.

The implementation of the voltage divider circuit can better be understood by the following description of FIGS. 3-6 which describes the realization of a 6/7 voltage divider circuit. FIG. 3 illustrates the basic n*m array of capacitors (C1.1-C6.7) which capacitors are all of equal value (C). There are n columns of capacitors with all n columns being connected together in parallel. Each column contains m series-connected capacitors which form a charging capacitance of (1m)*C or C/7 per column.

To obtain the required voltage division, the discharge capacitance of each column must be (1/n)*C or C/6 in this example. To accomplish this, (m-n) capacitors in each column (1 in this example) are bypassed for the discharge cycle. Diodes D1.0-D6.1 perform the bypass function by permitting all m capacitors per column (7) to be charged during the charge cycle but bypassing (m-n) capacitors (ex:C1.7) during the discharge cycle.

Figure 4:
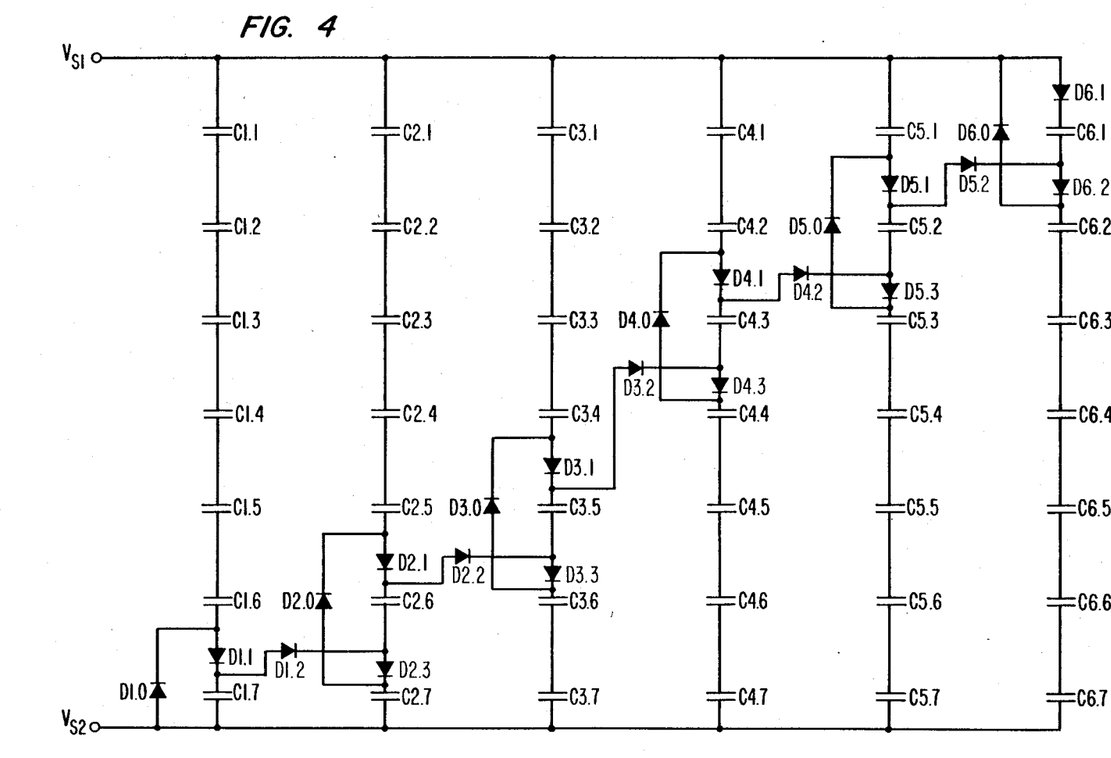

The bypassed capacitors must still be discharged during each discharge cycle so an alternate discharge path for these capacitors must be supplied. FIG. 4 illustrates the implementation of this discharge path. The diodes identified by a number ending in zero (ex:D1.0) function to bypass (m-n) capacitors per column for the discharge cycle. The odd numbered diodes (ex:D1.1) prevent the bypassed capacitors from discharging via any of the n columns. The diodes identified by a number ending in two (ex:D1.2) supply the alternate discharge path for the bypassed capacitors. Thus on FIG. 4, capacitor C1.7 discharges through diode D1.2, capacitor C2.6 discharges through diode D2.2, capacitor C3.5 discharges through diode 3.2, capacitor C4.3 discharges through diode 4.2, capacitor C5.2 discharges through diode D5.2, capacitor C6.1 discharges through diode D6.2.

Figure 5:
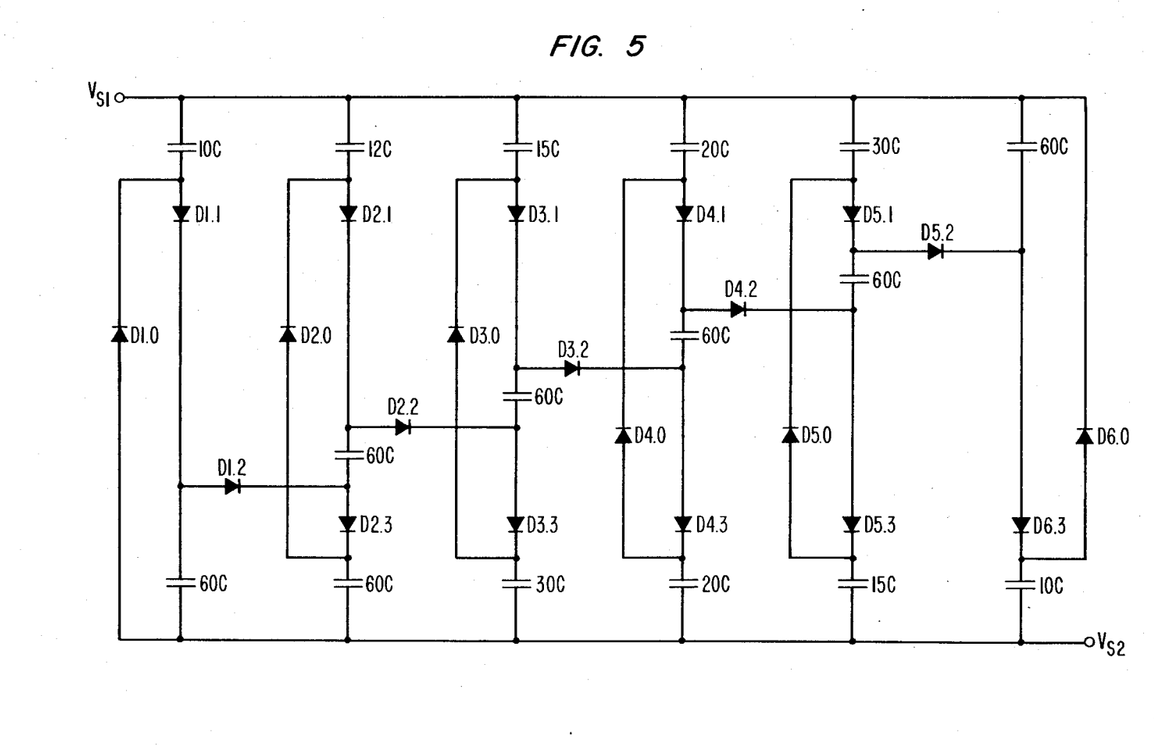
Figure 6:
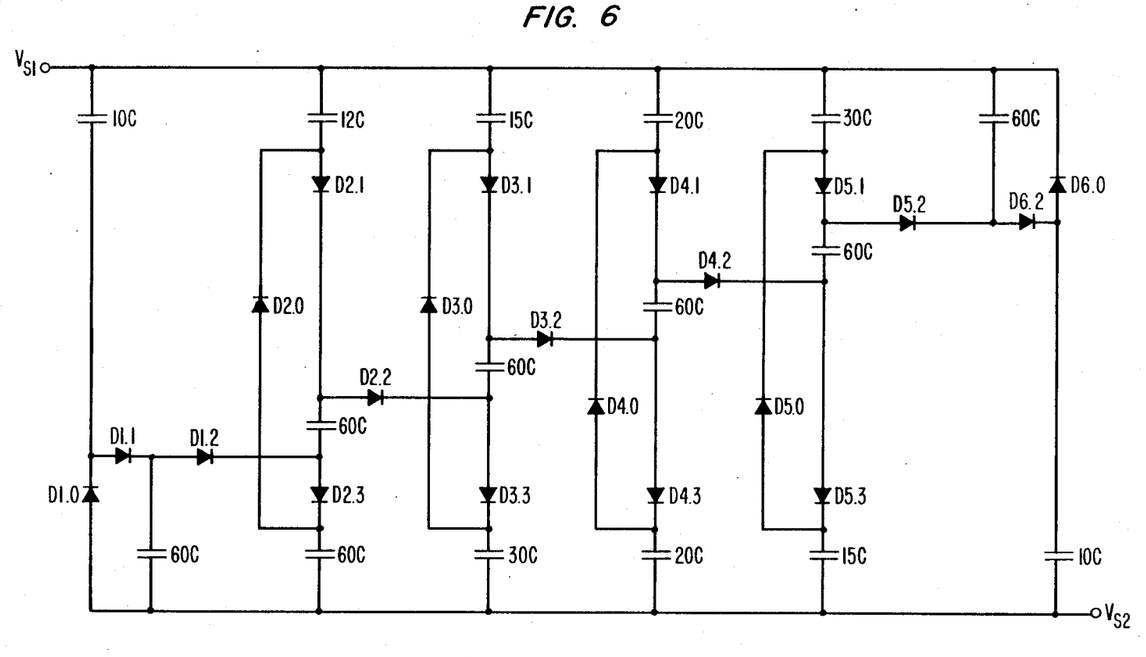

The series-connected capacitors not bypassed can be combined to reduce the overall number of capacitors in the voltage divider circuit. Thus, for example seriesconnected capacitors C1.1-C1.6 can be replaced by a single capacitor of value C/6. When the capacitor combinations are completed and all capacitor values converted to integer values, the structure of FIG. 5 is what results. This can be redrawn as shown in FIG. 6 to produce the general form illustrated in FIG. 1.

It is evident from FIGS. 3 and 4 that there are a number of variations possible in the capacitor bypass selection process. The example used in this description implemented a symmetric structure by bypassing capacitors C1.7, C2.6, C3.5, C4.3, C5.2, C6.1. An equivalent result would be obtained if capacitors C1.7, C2.6, C3.5, C4.4, C5.3, C6.2 had been bypassed, or any of the other obvious alternatives used. The sole requirement of the capacitor bypass selection is that m-n capacitors per column be bypassed and that an alternate discharge path (not in any column) be provided for the bypassed capacitors. To accomplish this, it is necessary to select the diode interconnections so that the bypass diodes will be forward biased during the discharge cycle. Since each capacitor in each column is charged to $V_{IN}/m$ during the charge cycle it is obvious that for a bypass diode to be forward biased, the j th capacitor in a column must discharge through its bypass diode to the junction of capacitors i and i-1 in the adjacent row where i<j. Thus, in FIG. 4 bypassed capacitor C1.7 must discharge through the bypass diode D2.0 to the junction between either capacitors C2.6 and C2.5 or capacitors C2.5 and C2.4 for diode D2.0 to be forward biased during the discharge cycle.

Using these constraints, any n/m voltage divider circuit can be realized using only capacitors and diodes. No other electronic switching circuitry need be used and the resultant circuit operates automatically without the need for control signals or extensive switching circuitry.

THE 1:M VOLTAGE DIVIDER

The above described n:m voltage divider circuit arrangement also applies to the 1:m voltage divider case. In order to illustrate this particular voltage divider configuration, the 1:2 and 1:3 voltage divider circuits are described below.

Figure 7:
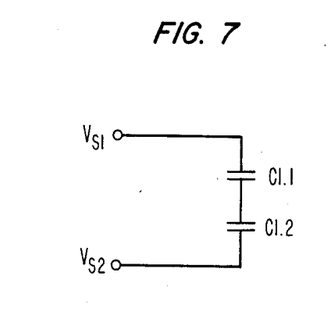
FIGS. 7–9 illustrate in step-by-step fashion the implementation of a 1:2 voltage divider circuit.

A 1:2 voltage divider is illustrated in FIG. 7, using the voltage divider circuit architecture described above. This voltage divider structure is implemented by starting with an array of capacitors of equal value, which array contains n columns of m series-connected equal value capacitors. In the 1:2 case, this comprises one column containing two capacitors. On FIG. 7, these capacitors are C1.1 and C1.2.

Figure 8:
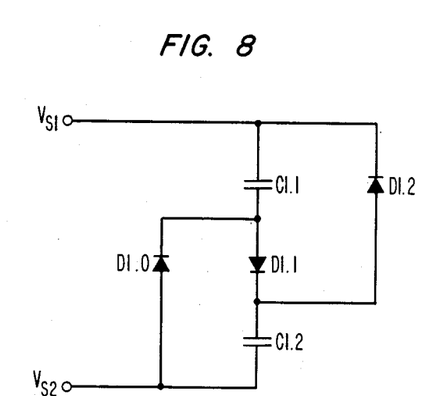

Since there is only one column, the charging capacitance is (1m)*C or C/2. To obtain the required voltage division, the discharge capacitance must be (1/n)*C or C. To accomplish this, (m-n) capacitors (1 in this example) are bypassed for the discharge cycle. Diodes D1.0-D1.2 are shown on FIG. 8 and perform the bypass function by permitting all m capacitors (2) to be charged during the charge cycle but bypassing (m-n) capacitors (C1.2) during the discharge cycle. The bypassed capacitor C1.2 must be discharged during each discharge cycle so an alternate discharge path is provided for capacitor C1.2 by diode D1.2.

Figure 9:
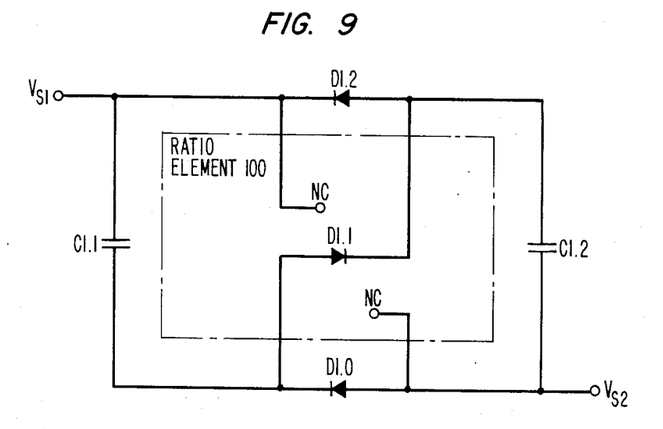

The resultant 1:2 voltage divider circuit is redrawn in FIG. 9 to reflect the general architecture illustrated in FIG. 1. In this case, two of the leads are not used and are labeled NC to indicate that there is no connection in this instance. Capacitors C1, C2 are realized by capacitors C1.1, C1.2 respectively and diodes D1, D2 are realized by diodes D1.2, D1.0 respectively. Diode D1.1 comprises ratio element 100.

Figure 10:
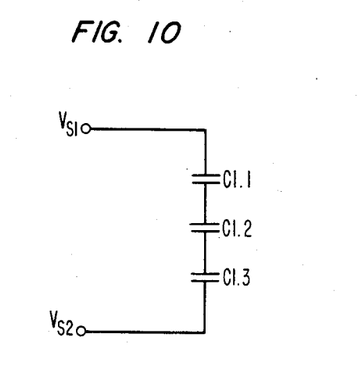
FIGS. 10–12 illustrate in step-by-step fashion the implementation of a 1:3 voltage divider circuit.

A 1:3 voltage divider is illustrated in FIG. 10, using the voltage divider circuit architecture described above. This voltage divider structure is implemented by starting with an array of capacitors of equal value, which array contains n columns of m series-connected equal value capacitors. In the 1:3 case, this comprises one column, containing three capacitors. On FIG. 10, these capacitors are C1.1-C1.3.

Figure 11:
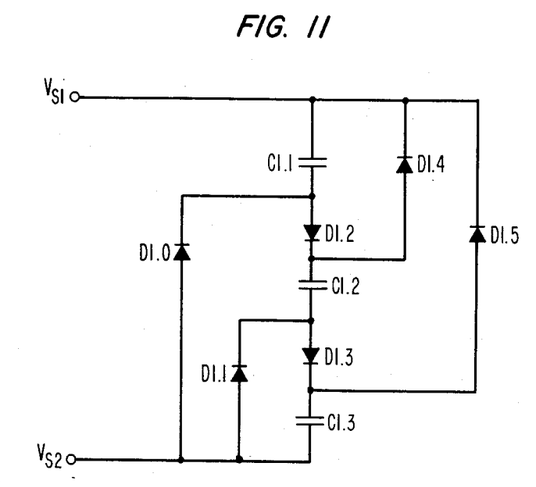

Since there is only one column, the charging capacitance is (1m)*C or C/3. To obtain the required voltage division, the discharge capacitance must be (1/n)*C or C. To accomplish this, (m-n) capacitors (2 in this example) are bypassed for the discharge cycle. Diodes D1.0-D1.5 are shown on FIG. 11 and perform the bypass function by permitting all m capacitors (3) to be charged during the charge cycle but bypassing (m-n) capacitors (C1.2, C1.3) during the discharge cycle. The bypassed capacitors (C1.2, C1.3) must be discharged during each discharge cycle so an alternate discharge path is provided for capacitors C1.2, C1.3 by diodes D1.4 and D1.5, respectively.

Figure 12:
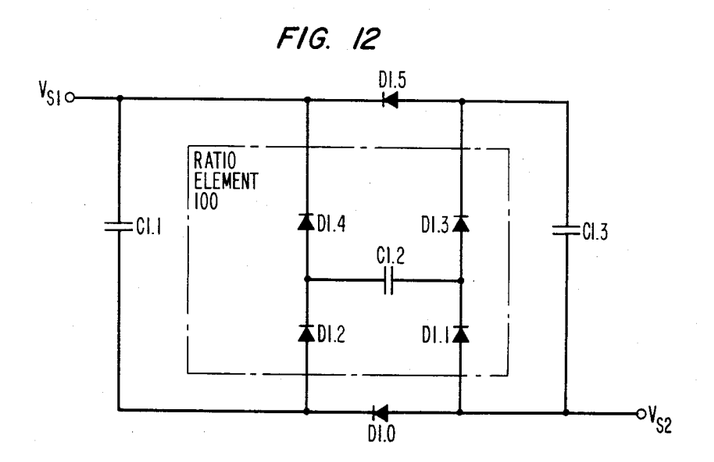

The resultant 1:3 voltage divider circuit is redrawn in FIG. 12 to reflect the general architecture illustrated in FIG. 1. In this case, capacitors C1.1, C1.3 realize capacitors C1, C2 of FIG. 1 respectively and diodes D1.5, D1.0 realize diodes D1, D2 of FIG. 1 respectively. Capacitor C1.2 and diodes D1.1-D1.4 realize ratio element 100.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the scope and the spirit of the invention.

What is claimed is:

1. A method transforming an input voltage of V to an output voltage of $(n/m)*V$, where $n>1$, wherein said output voltage is applied to output terminals, comprising the steps of:
   charging n sets of capacitors, each set containing m series connected capacitors of equal value, to said input voltage V;
   discharging said n sets of capacitors via n'discharge paths, each of said discharge paths containing n series connected capacitors; and
   connecting said n+1 discharge paths to said output terminals.

2. A dc-to-dc converter circuit for transforming an input voltage of V to an ouput voltage of $(n/m)*V$, which output voltage is applied to output terminals, comprising:
   n*m equal value capacitors connected in n sets, each set containing m series connected capacitors;
   means for connecting said n sets in parallel to said input voltage;
   means connected to selected ones of said n*m capacitors for providing n+1 discharge paths for said n*m capacitors, wherein each of said discharge paths comprise n series connected capacitors; and
   means connected to said providing means for connecting said n+1 discharge paths to said output terminals.

3. A dc-to-dc converter circuit for transforming an input voltage of V to an output voltage of $(n/m)*V$, where $n>1$, which output voltage is applied to output terminals, comprising:
   first and second capacitors, each having first and second terminals, wherein said first terminal of said first capacitor is connected to a first of said output terminals and said second terminal of said second capacitor is connected to a second of said output terminals;
   first diode means connected in a forward direction from said first terminal of said second capacitor to said first terminal of said first capacitor;
   second diode means connected in a forward direction from said second terminal of said second capacitor to said second terminal; of said first capacitor; and
   ratio setting means connected to said first and said second terminals of both said first and said second capacitors for presenting a discharge capacitance across said converter terminals equal to n/m of the charging capacitance.

4. A method of transforming an input voltage of V to an output voltage of $(n/m)*V$, where $n>1$, which output voltage is applied to output terminals comprising the steps of:
   charging n sets of series connected capacitors in parallel to said input voltage, wherein each of said n sets contain a capacitance of C;
   discharging said n sets of charged series connected capacitors in n+1 parallel paths, wherein each of said n+1 paths contain a capacitance of $(n/m)*C$; and
   connecting said n+1 paths to said output terminals.

5. A dc-to-dc converter circuit for transforming an input voltage of V to an output voltage of $(n/m)*V$, wherein $n>1$ which output voltage is applied to output terminals, comprising:
   n sets of series connected capacitors, each of said sets having a capacitance C;
   charging means for charging said n sets of series connected capacitors to said input voltage V;
   discharging means for providing n+1 sets of series connected capacitors from said n sets of series connected capacitors wherein each of said n+1 sets of series connected capacitors is of capacitance $(n/m)*C$; and
   means connected to said discharging means to connect said n+1 sets of series connected capacitors to said output terminals in parallel to produce said output voltage of $(n/m)*V$.

6. The circuit of claim 5 wherein said discharging means includes:
   means in each of said n sets of series connected capacitors for bypassing in the discharge path, a capacitance of (1m)*C in each of said n sets; and
   means connected to said bypassing means for serially connecting all of said bypassed capacitors into a capacitance of $(n/m)*C$.

7. The circuit of claim 6 wherein said discharging means further includes:
   means connected to said serially connecting means for connecting said capacitance of $(n/m)*C$ across said output terminals.

* * * * *